July 15, 1969 BING-HOU HAN 3,455,033

BALL CALCULATOR

Filed Oct. 24, 1966 3 Sheets-Sheet 1

INVENTOR.
Bing-Hou Han
BY [signature]
Attorney

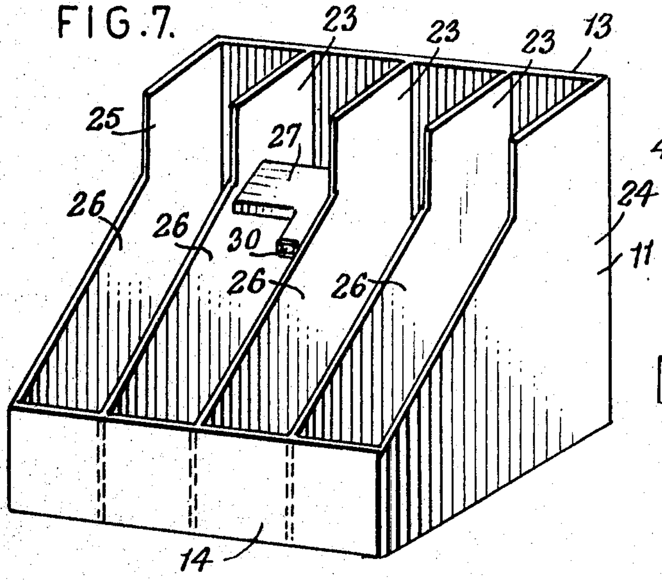
FIG. 8.
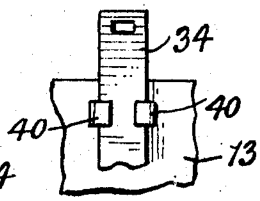
FIG. 9.
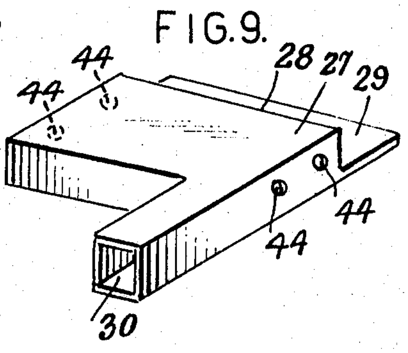
FIG. 10.
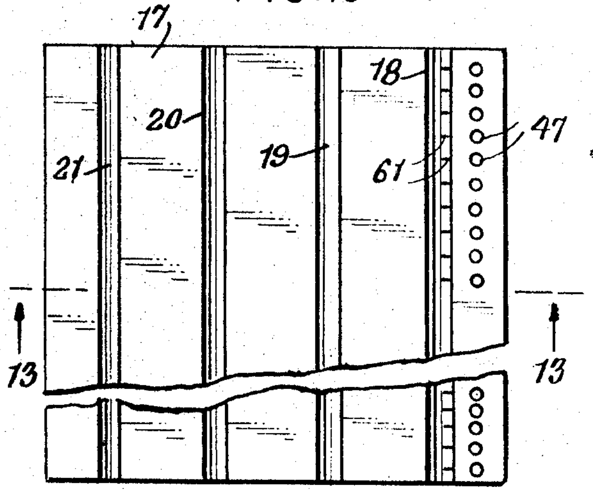
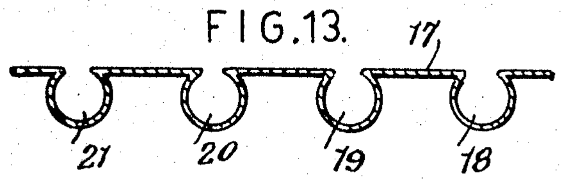
FIG. 11, FIG. 12
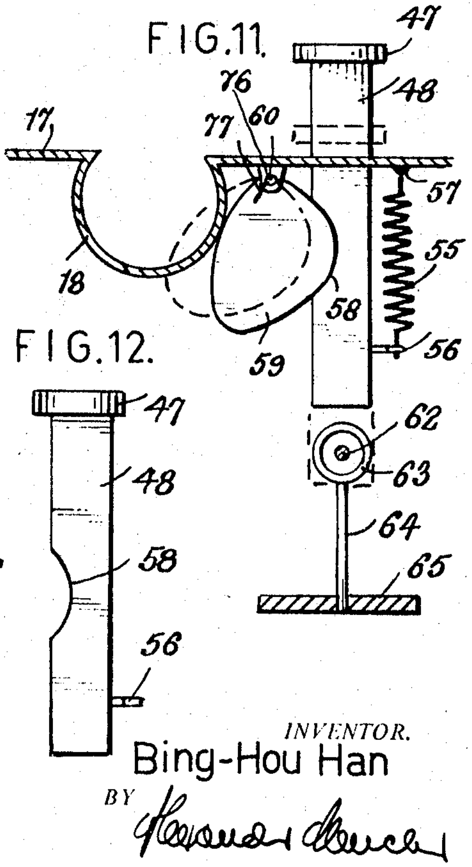
INVENTOR.
Bing-Hou Han
BY [signature]
Attorney July 15, 1969 BING-HOU HAN 3,455,033

BALL CALCULATOR

Filed Oct. 24, 1966 3 Sheets-Sheet 3

INVENTOR.
Bing-Hou Han
BY [signature]
Attorney 3,455,033

BALL CALCULATOR

Bing-Hou Han, 532 W. 111th St., New York, N.Y. 10025

Filed Oct. 24, 1966, Ser. No. 589,029

Int. Cl. G09b *23/02*

U.S. Cl. 35—31 9 Claims

ABSTRACT OF THE DISCLOSURE

The invention relates to the construction of a calculator wherein balls operative in inclined channels are utilized for calculation. Each of the ball channels are provided with keys some of which are interconnected with some keys in other channels, each of the keys successively controlling selection of a predetermined number of balls and releasing them for exposure to arrive at calculations.

This invention relates to calculators and has for one of its objects the provision of an inexpensive and easy-to-use calculator capable of performing various basic arithmetic problems. It is another object of the invention to provide a device for teaching elementary arithmetic to beginners.

In its broad aspect, the invention contemplates the provision of a cabinet or casing provided with a plurality of visible channels in which balls gravitationally roll, with keys arranged in groups adjacent to the respective channels; with channel-blocking means operative by the selective use of the keys to either maintain balls in the channels or to selectively permit the balls to be displaced according to the calculations desired.

The invention further contemplates the provision of ball-supply means by which the displaced balls can be restored to supply chambers at the upper ends of the channels and delivered therefrom into the channels.

With these and other objects to be hereinafter set forth in view, I have desired the arrangement of parts to be described and more particularly pointed out in the claims appended hereto.

In the accompanying drawings, wherein an illustrative embodiment of the invention is disclosed, FIG. 1 is a perspective view of a calculating device constructed in accordance with the invention, but with only one row of keys or plungers disclosed in order to simplify illustration;

FIG. 7 is a perspective view of the cabinet or casing with the front panel and top removed and with one of the ball-supply chambers in place;

FIG. 8 is a detail view showing the guiding lugs for one of the ball elevators;

FIG. 9 is a perspective view of one of the ball-supply chambers;

FIG. 10 is a top plan view of the channeled front panel of the cabinet or casing;

FIG. 11 is a sectional view through a part of the channeled front panel showing one of the plungers or keys and the channel-blocking cam means;

FIG. 12 is a view of one of the keys or plungers;

FIG. 13 is a sectional view, taken substantially on the line 13—13 of FIG. 10, looking in the direction of the arrows;

Figures 1, 2, 3, 4, 5, 6:
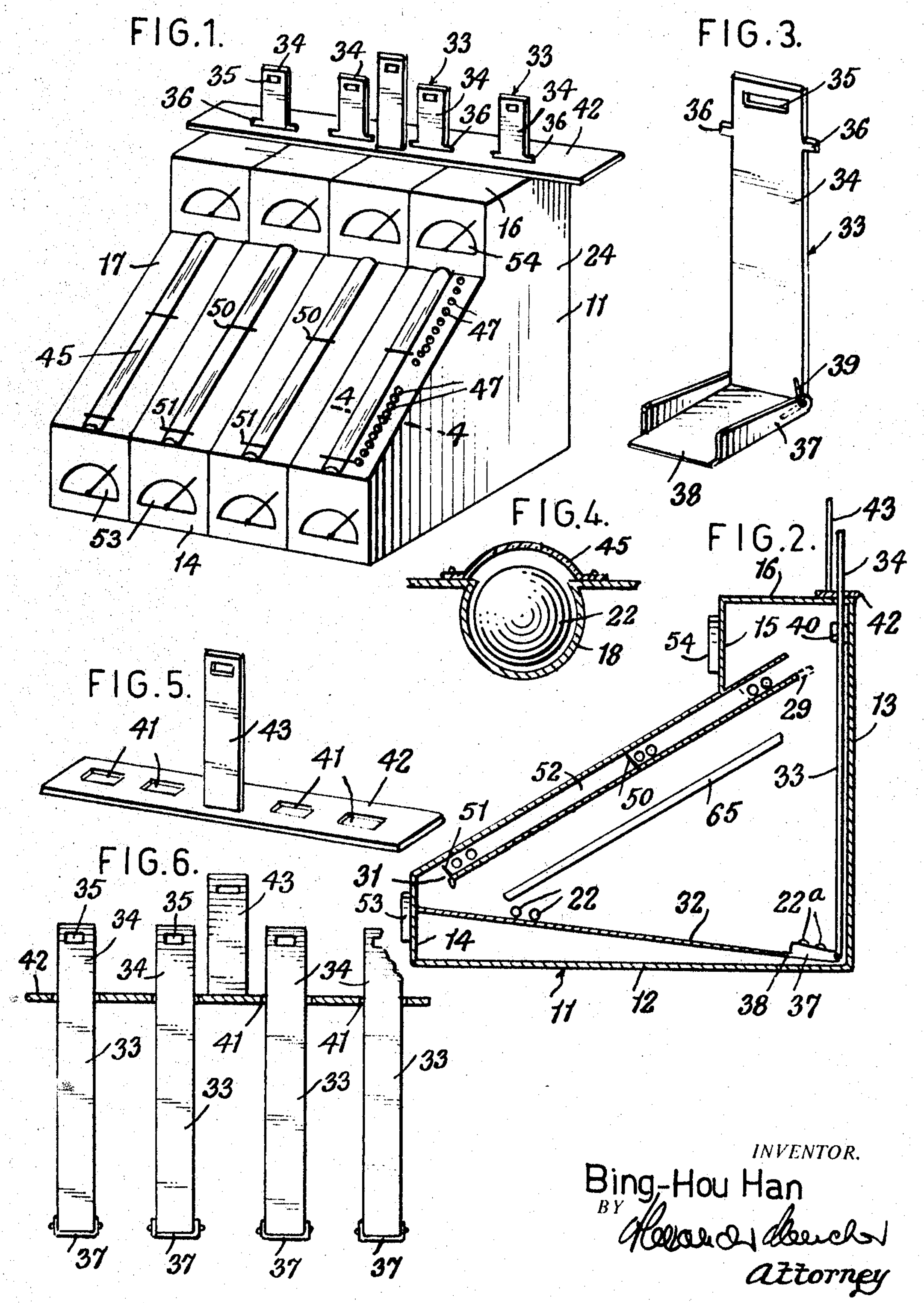
FIG. 2 is a vertical sectional view through the device.
FIG. 3 is a perspective view of one of the ball elevators.
FIG. 4 is a sectional view, taken substantially on the line 4—4 of FIG. 1.
FIG. 5 is a perspective view of the lifter plate for the ball elevators.
FIG. 6 is a vertical sectional view through the lifter plate shown in FIG. 5, showing the ball elevators passing through the plate.

Referring to the drawings, there is shown therein, and particularly in FIGS. 1, 2 and 7, the cabinet or casing 11 of the calculator. The same includes a bottom plate 12, a rear wall 13, a lower front wall 14; an upper front wall 15, a top plate 16, and side walls 24 and 25. The space between the upper front wall 15 and the lower front wall 14 is closed by an inclined, channeled panel 17, the same being provided with a plurality of ball-receiving channels, four of which are shown and indicated respectively at 18, 19, 20 and 21 (FIG. 13). When the channeled panel 17 is in position on the front of the cabinet or casing 11 as in FIGS. 1 and 2, it is in an inclined plane and the balls 22 in the channels in the panel tend to roll downwardly or toward lower front wall 14 of the cabinet.

Provided in the interior of the cabinet 11 is a plurality of spaced vertical partitions 23 (FIG. 7) cooperating with the side walls 24, 25 of the cabinet in forming four chambers 26. Mounted in each of said chambers 26 near the upper end thereof is a ball-supply holder 27, the details of which are shown in FIG. 9. In FIG. 7 only one of the ball-supply holders is shown, and the same is not seen in FIG. 2, but it will be understood that one of these ball-supply holders is located in each of the chambers 26 adjacent to the upper end of the same and in position to supply balls to each of the channels 18 to 21 inclusive.

Each of the ball-supply holders is open at the rear 28, said rear having a lower projecting lip 29, and the holder is provided at the front with a delivery spout 30. This spout enters into the upper end of the adjacent channel 18, 19, 20 or 21 so that the balls emerging from the spout will roll down into the channel and controlled therein by key-operated means to be described. When no obstacles are encountered in the channels, the balls will roll down through the channels and out of the open lower ends 31 of the same to reach a return ramp 32 (FIG. 2) within the lower part of the cabinet, to reach ball refilling devices or elevators 33, one of which is clearly shown in FIG. 3. It will be apparent that by interposing stop means in the channels or by removing such means therefrom the movement of the balls can be controlled.

A ball elevator 33 is provided in each of the cabinet chambers 26 for each of the ball-supply holders 27 and each of the elevators has an elongated upstanding plate 34 provided near its upper end with a finger-engaging aperture 35 and with lateral stop lugs 36. At its opposite end, the plate 34 is pivotally attached to one end of a ball tray 27. Said tray is provided at its forward end with a lip 38 and the tray is spring-biased by means of a torsional spring 39 in a manner to normally incline the tray slightly upwardly, and when in the lowered position of the elevator to bring the lip 38 into the same plane as the ramp 32, substantially as shown in FIG. 2. Thus, balls 22 will roll down each of the ramps 32 and come to rest in the respective trays, as shown at 22*a* in FIG. 2. To deliver the balls into the several ball-supply holders merely requires the elevators to be manually lifted by means of the plates 34. The plates 34 are guided by means of guide lugs 40 (FIG. 8) located on the inner surface of the rear wall 13 of the cabinet, and the plates 34 are vertically slidable through suitable slots provided for them in the top plate 16 of the cabinet as well as through similar slots 41 provided in a lifter plate 42 (FIGS. 5 and 6).

One end of a handle plate 43 is fixedly attached to and projects upwardly from the top of the lifter plate 42. Through the arrangement described, each of the elevators 33 can be raised independently of the others so that balls can be supplied to any particular ball-supply holder. However, when it is desired to simultaneously elevate all of the ball elevators to deliver balls into all of the four channels, the plate 43 is grasped and raised to lift the plate 42 from off the top of the cabinet, the plate 42 in such raising movement, engaging the underside of the lugs 36 on the elevators plates 34 and raising all of them. As the ball elevators rise, the lip 38 on each of them will come into contact with the lip 29 on the ball-supply holder 27 and the tray 37 will then be tilted downwardly against the bias of the spring 39 to cause the balls to roll out of each tray and into each of the ball-supply holders 27.

The ball-supply holders 27 are attached between the partitions 23 by means of bolts or screws inserted through the holes 44 in the side walls of each of the ball holders and said ball holders when fitted in place between the partitions are slightly tilted in a manner so that the balls deposited in them gravitationally roll toward and out of the outlet spout 30 to spill therefrom into the several channels 18 to 21 inclusive. Each of the channels is covered by a transparent cover member 45 (FIGS. 1 and 4) through which the number of balls in each channel is readily ascertainable.

Provided along the side edge of each of the channels 18 to 21 inclusive are control keys 47 in the form of plungers 48, an example of which is shown in FIGS. 11 and 12. These plungers or keys are associated with means to either retain balls in or release them from the channels. In FIGS. 1 and 10 of the drawings, these keys or plungers 47 are shown as being located along the edge of only one of the channels. However, it will be understood that the same, and the ball-actuating means associated with them, are located at each of the channels 18 to 21 inclusive.

Each of the channels is provided with gates, the upper one thereof being indicated at 50, and the lower one at 51. After adding or subtracting a certain number of balls in the lower channel, or that part indicated at 52 in FIG. 2 and located below the upper gate 50, the balls retained in said part of the channel will be the result of the arithmetic calculation performed.

The number of continuous operations performed without requiring the refilling of the ball-supply holders, is directly proportional to the capacity of the supply holders. For example, if one of the supply holders 27 has a capacity of 45 balls then one column or channel of the device can be used to add ten random one-digit numbers. The sum of the first ten consecutive numbers is 45 and this means an average value of 4.5 for each number. Therefore, to add ten random numbers 45 balls are needed. Thus, with 45 balls in each of the supply holders ten random numbers in each row or channel can be added or subtracted. The dials indicated at 53 and 54 in FIG. 1 are the upper and lower registers and are used only in multiplication and division.

As will be seen in FIG. 10, each channel has an upper portion alongside of which are ten keys or plungers. Said upper portion is that which is located above the upper gate 50. The lower portion of the channel is that which is located below the gate 50 and said lower portion also has ten keys or plungers arranged alongside.

Figure 14:
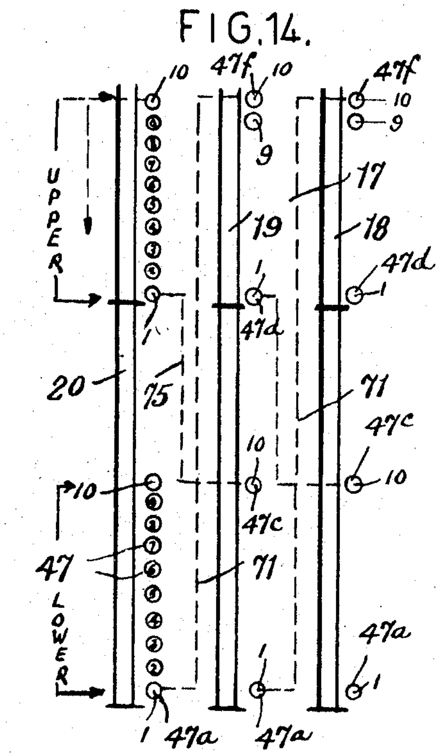
FIG. 14 is a diagrammatic view showing three of the ball-channels and showing the relationship of the keys or plungers thereto.

In FIG. 14 is shown a schematic diagram of three adjacent channels, for example, the channels 18, 19 and 20. The total length of a channel is 38 balls long. As above stated, ten keys are mounted alongside of the upper portion of each channel (above gate 50) and another ten keys are located alongside of the lower portion of the lower part of the channel. Each key is provided with an identifying numeral on its top. The keys for the upper portion of the channel start with "1" at the bottom and end with "10" at the top, and the keys for the lower part of each channel start with "10" at the top and end with "1" at the bottom as indicated in FIG. 14. The keys are thus arranged in the order of decreasing values with the numeral "10" key at the top of each group. The keys in the upper group are used to measure the number of balls needed in each operation and for release to the lower part of the channel. The lower keys, except for the uppermost "10" key are used for subtraction as will be hereinafter explained.

One of the keys 47 and its associated parts is shown in FIG. 11. The stem or plunger portion 48 of the key is slidable through an aperture in the channeled plate 17 shown in full lines in FIG. 11 by means of one or more springs, one being shown at 55. Said spring 55 has one end attached to a projection 56 extending from the stem on the key and has its other end attached at 57 to the underside of the plate 17. The plunger 48 is formed with a notch 58 which accommodates a spring-biased cam 59 (FIG. 11) while the plunger is maintained in its elevated position under the bias of the spring 55. When the plunger is manually depressed and the notch 58 is moved away from the cam 59, the cam will swing on its pivot 60 so that a portion of it will extend through a slot 61 in the channel of the plate 17 and such portion will extend into the channel and hold any balls behind it and keep them from rolling down through the channel.

Located below the plunger is a cable 62 which passes through rings 63 at the top of posts 64 which project upwardly from plates 65 located in the cabinet between the partitions thereof and below the channels. One of these plates 65 is shown in FIG. 2, but therein the posts and rings are omitted for simplicity in illustration.

Figures 15, 16:
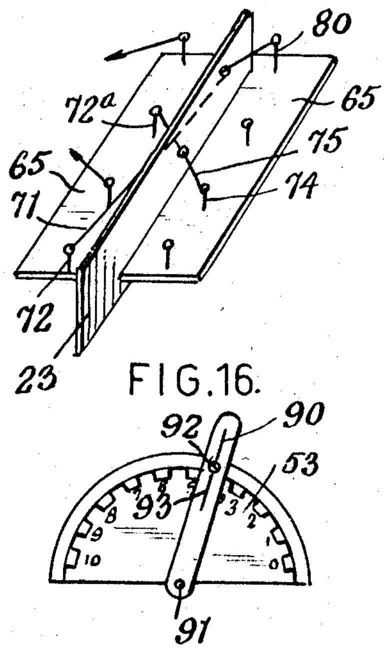
FIG. 15 shows two of the supporting plates and the looped cable guides upstanding therefrom.
FIG. 16 shows one of the registers.

In FIG. 15 two of the plates 65, with a portion of one of the partitions 23 between them, are shown.

Figure 17:
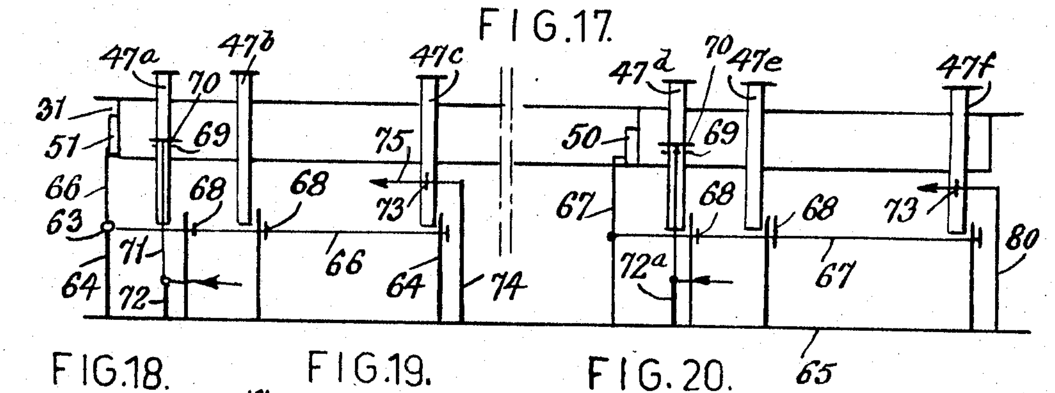
FIG. 17 is a diagrammatic view, showing one of the ball channels and the association of some of the plungers or keys therewith.

In FIG. 17 is shown a diagrammatic view of one of the ball channels, with the lower end 31 of the channel shown at the left. From the left, the keys shown at **47*a*, 47*b*, and 47*c* are respectively the lower No. 1 key, the lower No. 2 key and the lower No. 10 key. The keys on the right side of the figure namely, those indicated at 47*d*, 47*e* and 47*f* are respectively, the upper No. 1 key, the upper No. 2 key and the upper No. 10 key. The lower and upper gates 51 and 50 are connected by cables 66 and 67 respectively. These cables pass through rings 63 on rods 64 under all ten keys of each channel section. On the cable, at a point to the right of each ring is provided an enlargement 68**, which can be a knot in the cable, and which is greater in diameter than the internal diameter of the rings so that the pressure exerted on the cable by the descending plunger portion of the keys will always be transmitted in one direction namely, to open the gates.

Every No. 1 key, except that in the first column or channel, has two lugs 69. On these lugs rests a ring 70.

Figure 19:
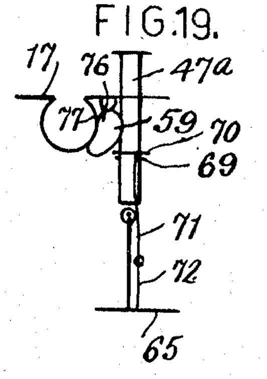
FIG. 19 shows the No. 1 plunger and parts associated therewith.
Figure 20:
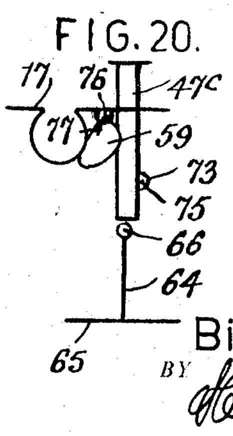
FIG. 20 shows one of the No. 10 keys or plungers and its associated parts.

The ring 70 (FIG. 19) on a lower #1 key **47*a* is connected to the upper #10 key 47*f* of the next lower column by means of a cable 71. Cable 71 passes through a rod 72 and through one of the partitions 14 and hook 73 on the key 47*f* of the next lower column 80, and extends to the upper #1 key 47*d* of the next higher column. The arrangement of the elements for the keys and the associated parts for the upper group (right hand portion of FIG. 17) is quite similar to that of the keys in the lower group except that the key 47*d* is connected to the lower #10 key 47*c* of the next lower column and the key 47*f* to the lower #1 key 47*a*** of the next higher column.

Figure 18:
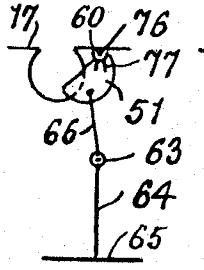
FIG. 18 shows the means for operating one of the channel gates.

The arrangement of the lower gate 51 is disclosed in FIG. 18. The gate 51 is pivoted at 76 on the under side of the channel plate 17 and has a torsional spring 77 biasing it to a normally channel-blocking position. The gate 51 is connected to cable 66 as shown. The rod 64 with the ring 63 at its upper end extends from the plate 65.

In FIG. 15 is shown the arrangement of the plates 65 with some of the upstanding ringed posts thereon. Each of the plates 65 is held in place between the partitions 23 by screws or other fastening elements. The cable 71 is connected at one end to the ring 70 of the key 47*a* (not shown in FIG. 15), through the ring on post 72 and is connected at its other end through the ring on the post 80 (FIG. 15) to reach and connect to the upper #10 key 47*f* of the next lower column as seen in FIG. 14. This provides a link between the upper #10 key 47*f* and the lower #1 key 47*a* of the next higher column and this link is necessary for borrowing when using the apparatus for subtraction. The cable 75, connected between the rod 74 below the lower #10 key 47*c* and rod 72*a* under the upper #1 key of the next higher column is needed when performing an operation of addition.

In FIG. 16 is shown one of the registers 53 or 54. It consists of a numbered dial having notches indicated from 1 to 10 and having a pointer or indicator 90 pivoted at 91. The pointer or indicator carries a spring-biased pawl 92 for engagement with any selected one of the notches. The indicator can be made of transparent material and can be provided with a hair line 93 to clearly show the particular number selected.

For the purpose of addition, the lower channels are first cleared of balls by pressing the lower #10 key starting from right to left. Next, the keys of the upper channels which correspond to the digits of the first number, are depressed. For example, if the problem is to add 98 to 97 the upper #9 key and the upper #8 key of the first and second columns is depressed (here the first column is the column of tens) releasing nine and eight balls into the corresponding lower channels. The upper #9 key and the upper #7 key is then depressed to add nine and seven more balls to the lower section of the first and second column respectively. This makes a total of eighteen balls in the first column and a total of fifteen balls in the second column. Since there are more than nine balls in each column, the lower #10 key of each column is pressed successively to thereby carry ten to the next higher column. When carrying the start is always made from the left where the highest digit is located. Pressing the lower No. 10 key of the first column will remove ten balls from the lower section of that column and will add one to the lower section of the next higher column. After carrying, the eight balls in the mid-section of the channel will roll down into the lower section of the first column. Next the lower No. 10 key of the second column is pressed releasing ten balls from that column and adding one ball to the next column. The result now reads 195.

In performing the operation of subtraction, all of the lower channel portions are cleared as before. Next, the number to be subtracted, the minuend is entered in the lower channels. For example, in subtracting 95 from 129, the upper keys are pressed in order to enter 129 into the lower channels. The subtraction is then started from the lowest digit by pressing lower key No. 5 of the third column to thereby remove five balls from that column. After the five balls are removed there are four balls left in the third column and this is the last digit of the final result. When we go onto the second column it will be immediately realized that the minuend (2, representing by the two balls in the lower section of the second column) is less than the subtrahend 9 and therefore it is necessary to borrow from the next higher column. This is done by pressing the upper No. 10 key of the second column. This operation releases ten balls from the upper to the lower section and subtracts one from the lower section of the first column. After borrowing, there is no ball left in the lower section of the first column. Augmented with the ten balls borrowed from the other column, the number of balls in the second column is now 12. In subtracting nine from twelve, we have three balls in the second column. The result is 34 as indicated by the balls in the second and third column.

As an example of multiplication the problem of 35 times 5, equaling 175, is carried out step by step. There are two methods to solve the problem. The first one is preferably used to illustrate to young pupils the physical meaning of multiplication. We first enter the smaller number 5 into the first upper register from the right, or the right hand register 54 (FIG. 1). If the smaller number is a three-digit number then it should be entered into three consecutive upper registers. Then 35 is permitted into the lower channels. Since we have already 35 in the lower channels we will add 35 four times to the original 35. The procedure of addition operation is then followed, adding 35 to 35 and another 35 to the sum of the first two and so on. The result after the excessive balls have been carried to the next higher column, reads 175. As a reminder, the indicator of the register may be turned to the next lower numeral when one of the repeated additions has been completed. When the indicator reaches zero the multiplication is completed.

The second method is to multiply the individual digits of two numbers mentally according to the multiplication table. First the two numbers are entered separately into the upper and lower registers 54 and 53. In this problem 35 is entered into the upper registers and 5 in one of the lower registers. The multiplication is proceeded from right to left. 5 times 5 is 25 and this result is entered into the lower sections of the last two columns. Then 5 times 3 equals 15 is entered into the column of hundreds and tens or the first and second column. The product will be 175 as was obtained by the first method.

To illustrate the operation of division we will divide 325 by 5. There are also two methods of procedure in division operation. The first one is repeated subtraction; the divisor is repeatedly subtracted from the dividend until the remainder becomes zero or the desired decimal figure is reached. This method is useful in teaching basic arithmetic. The dividend is entered into the lower sections where repeated subtraction may be carried out. The divisor is entered into the lower registers 53. The subtraction is started from the highest digit of the dividend and the quotient is entered into the upper registers 54.

In the second method, we enter the divisor 5 into the upper register 54 and the dividend into the lower sections of the appropriate column. If the dividend is 325, we start the division from the highest digit by subtracting 30 from the first two digits of the dividend ($6\times5$ (the divisor) equals 30). Therefore the first digit of the quotient is 6 and this 6 is entered into the lower register below the second column. In repeating the procedure just completed, we find that the second digit of the quotient is 5 and no balls are left in any of the lower channels indicating that the remainder is zero. The final result of 65 is shown by the lower registers 53.

What I claim is:

1. A calculator comprising, a cabinet provided with a plurality of inclined ball channels, a supply chamber at the upper end of each channel, each chamber having a ball outlet directed into an adjacent channel so that the balls from the chamber will enter the channel and descend therein, a plurality of key controlled abutments interposable in the channels to retain the balls therein, and means for elevating balls displaced from the channels and restoring said balls into the supply chambers, wherein the channels have apertured walls, some of said abutments being pivoted cams entrant into the apertures in the walls of the channels to cause blocking of the channels, and the means for elevating the balls being vertically slidable trays which receive the balls below the channels and elevate the balls and deposit them into the supply chambers.

2. In a calculator according to claim 1, wherein the vertically slidable trays can be moved to feed balls into any of the supply chambers or to all of the said chambers simultaneously.

3. A calculator comprising, a cabinet provided with a plurality of inclined ball channels, a supply chamber at the upper end of each channel, each chamber having a ball outlet directed into an adjacent channel so that the balls from the chamber will enter the channel and descend therein, a plurality of key controlled abutments interposable in the channels to retain the balls therein, and means for elevating balls displaced from the channels and restoring said balls into the supply chambers, wherein the ball channels are arranged in side-by-side relationship, the ball supply chambers each having a forward spout directed into a channel, the supply chambers being open at the rear and having a lip at said rear opening, the elevating means including trays carrying balls, said trays being spring-biased and each tray having a lip for contact with the lip on a supply chamber when the elevating means is raised to thereby tilt the tray and cause the balls therein to roll into the supply chambers.

4. A calculator according to claim 3, wherein the elevating means are arranged for independent elevating movement of any one tray without affecting the others, and means is provided by which all of the trays can be simultaneously elevated to feed balls simultaneously into all of the supply chambers.

5. In a calculator, channels down which balls roll, gates normally blocking the channels to retain the balls in the channels, cam means interposable in the channels for maintaining balls therein, plungers operative to cause movements of selected cams into the channels, said plungers being operative also to cause opening movements of the gates, and spring means for biasing the plungers to raised positions, wherein a plunger is operative to insert a cam in a channel and to successively open one of the gates controlling the respective channel portion.

6. A calculator comprising, a casing having a plurality of ball-receiving channels down which balls are adapted to gravitationally roll, means for supplying balls into said channels, a plurality of spaced keys arranged alongside of the channels, cam means controlled by the keys for channel-blocking purposes, gate means controlled by the keys for also blocking the channels and holding the balls therein against descending movement, said gate means being displaceable to non-blocking position by the depression of the keys, and linking means between some of the keys by which the linked keys can be rendered effective to cause the cam means to be moved to blocking positions and the gates to be opened.

7. A calculator according to claim 6, wherein the keys are arranged in two groups for each channel, with the groups arranged in spaced relation and with an intervening space between them, and with the linking means arranged between keys in one group with keys in another group.

8. A calculator according to claim 7, wherein the linking means between the keys are flexible cords or cables.

9. A calculator comprising, a cabinet provided with a plurality of visible inclined channels for holding a plurality of balls, keys arranged in spaced groups of ten along the edges of the several channels and with intervening space between the groups for each channel, cams insertable in the channels operative to release selective number of balls, gate means normally positioned in the channels for maintaining the balls against descent therein, the keys being connected to the cams and gates and being effective successively to release a selective number of balls and to open gates and permit the descent of said selected numbers of the balls according to the depression of the required keys, a chamber in the cabinet below the channels and into which the balls roll after leaving the channels, ball elevators in said chambers toward which the balls roll and which receive the balls, the elevators being mounted so that they may be independently or collectively manually lifted to raise the balls held by them and then elevated to deliver the balls to the channels at the upper ends thereof.

References Cited

UNITED STATES PATENTS

| | | | |
|---|---|---|---|
| 569,348 | 10/1896 | Phillips | 235—18 |
| 3,127,686 | 4/1964 | Goldfarb | 35—31 |
| 3,295,229 | 1/1967 | Fisher | 35—31 |

STEPHEN J. TOMSKY, Primary Examiner

U.S. Cl. X.R.

235—18, 68